US 7,936,973 B2

(12) United States Patent
Barbieri

(10) Patent No.: US 7,936,973 B2
(45) Date of Patent: May 3, 2011

(54) DETECTING A CONTENT ITEM IN A DIGITAL VIDEO STREAM

(75) Inventor: Mauro Barbieri, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 1059 days.

(21) Appl. No.: 10/564,919

(22) PCT Filed: Jul. 14, 2004

(86) PCT No.: PCT/IB2004/051219
§ 371 (c)(1),
(2), (4) Date: Jan. 17, 2006

(87) PCT Pub. No.: WO2005/009043
PCT Pub. Date: Jan. 27, 2005

(65) Prior Publication Data
US 2006/0227250 A1  Oct. 12, 2006

(30) Foreign Application Priority Data
Jul. 18, 2003  (EP) .................................... 03102221

(51) Int. Cl.
*H04N 9/80* (2006.01)
(52) U.S. Cl. ..................... 386/250; 386/248; 386/249
(58) Field of Classification Search .......... 386/1, 45–46, 386/125–126
See application file for complete search history.

(56) References Cited

U.S. PATENT DOCUMENTS

| 5,485,219 A | 1/1996 | Woo |
| 2002/0186768 A1 | 12/2002 | Dimitrova |
| 2005/0276567 A1* | 12/2005 | Okuyama et al. ............... 386/46 |

FOREIGN PATENT DOCUMENTS

| EP | 1006685 A2 | 6/2000 |
| EP | 1427224 A2 | 6/2004 |
| GB | 2396050 A1 | 6/2004 |

OTHER PUBLICATIONS

Jian Feng et al, "Scene Change Detection Algorithm for MPOEG Video Sequence", Sep. 1996, Proceedings of the Int'l Conf. on Image Processing, IEEE, US, pp. 821-824, XP010202784.

* cited by examiner

*Primary Examiner* — Thai Tran
*Assistant Examiner* — Nigar Chowdhury
(74) *Attorney, Agent, or Firm* — Edward W. Goodman

(57) ABSTRACT

The invention relates to a method of detecting a boundary of a content item in a digital video stream. The method comprises the steps of determining (130) an average bit rate of the video stream over a period of time, and detecting (140) a change of the average bit rate indicating the boundary of the content item. A moving average of the bit rate may be determined. The method can be used for an encrypted digital video stream. The invention also relates to a device for detecting a boundary of a content item in a digital video stream. The invention further relates to a receiver for receiving at least one content item in a digital broadcast video stream, and a video recorder for recording at least one TV program.

12 Claims, 3 Drawing Sheets

DETECTING A CONTENT ITEM IN A DIGITAL VIDEO STREAM

The invention relates to a method of detecting a boundary of a content item in a digital video stream. The invention also relates to a device for detecting a boundary of a content item in a digital video stream. The invention further relates to a receiver for receiving at least one content item in a digital broadcast video stream, and a video recorder for recording at least one TV program.

US patent 2002/0186768 describes a method of content detection based on data obtained in a process of compressing video, e.g. by a MPEG encoder. The MPEG encoder encodes video data from a TV broadcaster, the Internet, etc. The MPEG encoder generates the data such as a current bit rate value combined with a quantizer value to indicate fast varying or very complex scenes in the video, e.g. to indicate visual complex pictures or pictures containing fast motion. This encoding bit rate measures an amount of bits required for encoding a piece of video, and it usually increases for fast moving pictures and visually complex scenes.

However, the encoding bit rate cannot reliably indicate, for example, whether the video comes from a movie containing fast motion or a commercial with fast moving scenes. The known method cannot reliably indicate a boundary of a content item using the encoding bit rate. Moreover, the method known from US2002/0186768 can be used only when the MPEG encoder is available.

It is an object of the present invention to obviate the drawbacks of the known method and to provide a method of detecting the boundary of a content item in a digital video stream, which method is more reliable and can be used without any MPEG encoder.

This object is realized in that the method of the present invention comprises the steps of:
determining an average bit rate of the video stream over a period of time, and
detecting a change of the average bit rate indicating the boundary of the content item.

The content items may vary in their quality and, hence, bit rates. For example, commercials may have higher bit rates because companies usually pay for high quality advertisement material. In case of a broadcast digital video stream, broadcasters may, for example, keep the bit rate of a channel constant but allocate different bit rates to content items in accordance with a type of content.

The bit rate is a rate of data allocated to a content item in the digital video stream. The bit rate may be indicated as additional information in the digital stream. For example, in digital video broadcasting (DVB), a number of streams carrying video, audio, control data formed into packets of a certain type may be transmitted. With the video data in the packets having a predetermined or indicated size, it is possible to determine the bit rate of the video stream.

The average bit rate may be calculated in various ways, e.g. simply for successive periods of time or, alternatively, a moving average of the bit rate may be determined. Of course, other manners of calculating a value of the bit rate over a period of time may be envisaged.

The boundary of the content item may be ascertained on the basis of detecting the change of the average bit rate, for example, by determining a deviation of the average bit rate value exceeding a predetermined threshold, a deviation of the change of the average bit rate value exceeding a certain percentage of said value, etc.

The present invention has the advantage that the average bit rate is more reliable and robust than the encoding bit rate known in the prior art. The determination of the average bit rate over the period of time smoothes variations which do not indicate real changes in the type of content.

A further problem associated with the known method of content detection is found when the content is in an encrypted digital stream. The method known in the prior-art document US2002/0186768 cannot be applied to the encrypted digital stream. This known method would require decrypting the stream, decoding it to uncompress the stream and re-encoding the stream to compute the encoding bit stream. The known method can be applied only to MPEG data representing groups of pictures in the stream, and is based on a mean absolute difference (MAD) value. This MAD value represents an average of magnitudes of vectors used to describe movement of video blocks in frames. Obviously, this information is not accessible in the encoded video stream.

In turn, the method of detecting the boundary of the content item according to the present invention can be applied to the encrypted digital video stream. The method is based on the average bit rate of the stream and is not affected substantially in the case of the encrypted stream.

The method of the present invention has the advantage that it works fast for the encrypted streams, i.e. the average bit rate can be easily calculated also for the encrypted streams without any decryption. Moreover, if the boundary of the content item in the encrypted stream is detected, only a part of the digital encrypted stream belonging to the content item may need to be decrypted for further purposes such as recording the content item, while the rest of the stream need not be decrypted.

In one of the embodiments, the method of the present invention can be applied in an Electronic Program Guide (EPG) of the TV system. In the EPG, broadcast schedule data (EPG data) indicating a beginning and/or end of broadcasting at least one content item may be available in advance, i.e. before the broadcast of the content item. According to the method of the present invention, the detection of the boundary of the content item may be used to verify whether the EPG data are in accordance with the detected boundary of a respective content item in the video stream. This may be utilized in a video recorder for precisely controlling the beginning and end of recording the broadcast content item.

The object of the present invention is also realized in that the invention provides a device for detecting a boundary of a content item in a digital video stream, the device comprising:
means for determining an average bit rate of the video stream over a period of time,
means for detecting a change of the average bit rate indicating the boundary of the content item.

Said device may be incorporated into a receiver for receiving at least one content item in a digital broadcast video stream; or a video recorder for recording at least one TV program, comprising such a receiver and means for recording the TV program based on its detected boundary in the video stream.

These and other aspects of the invention will be further elucidated and described with reference to the accompanying drawings, wherein.

Figure 1:
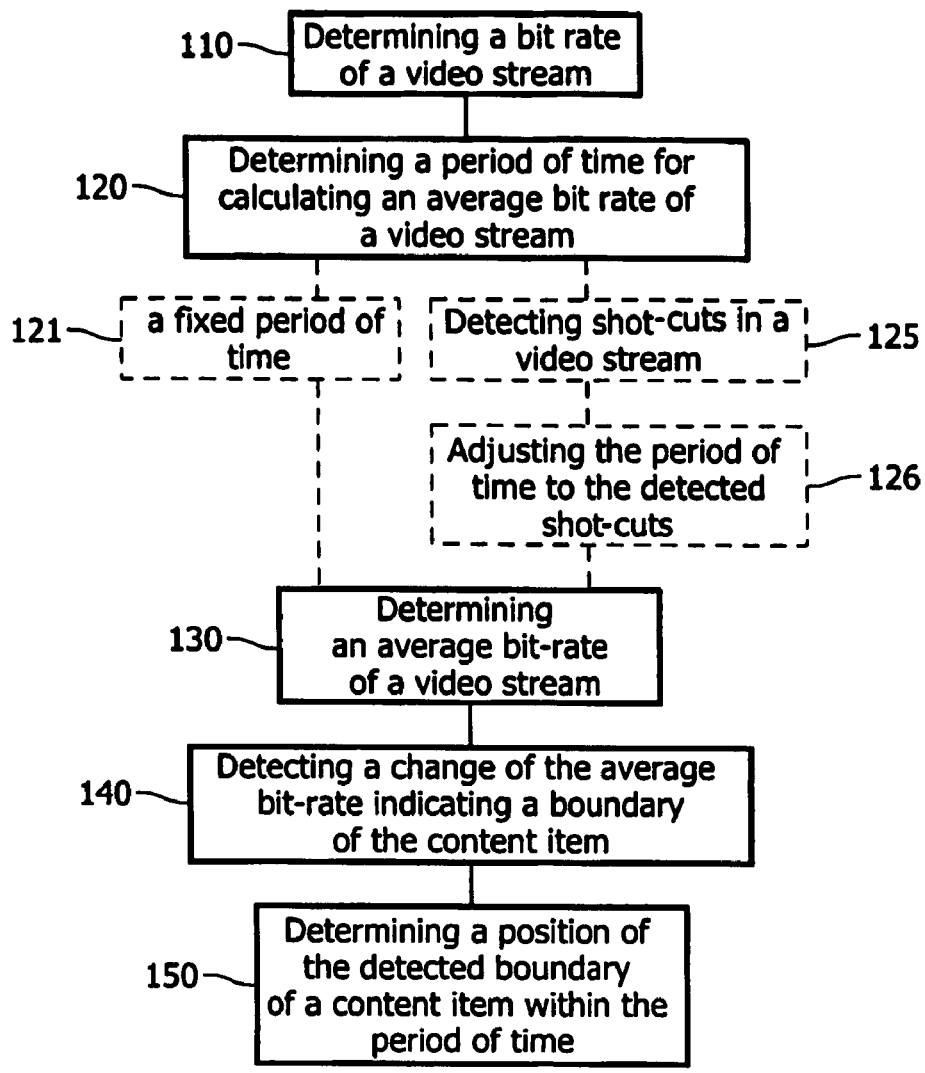
FIG. 1 shows an embodiment of the method of the present invention.

FIG. 1 shows an embodiment of a method of detecting a boundary of a content item in a digital video stream. The video stream may be obtained by reading out information from a data carrier such as a CD-ROM disk (Compact Disk Read Only Memory), a DVD disk (Digital Versatile Disk), a magnetic carrier, etc. Alternatively, the video data may be received in a known manner from a video broadcaster, e.g. using digital video broadcasting (DVB), video on demand systems, the Internet, etc.

The bit rate of the video stream may be determined in step 110. The video stream is usually packetized and kept in so-called frames. The frames may have a header and a body, and the header comprises information about the data contained in the body. The header may indicate information related to a bit rate usually expressed as the number of bits transmitted per second. For example, the digital stream, according to the MPEG standard, obtained by using the DVB broadcasting or from the DVD disk track may contain a plurality of the packetized elementary streams. The packets of the elementary stream may have a fixed or variable size. The packets may have different types and belong to different elementary streams. Therefore, packets belonging to elementary streams carrying pay load information, e.g. so-called transport streams, may need to be filtered out. The fixed-size packet of the transport stream may comprise, for example, 184 B of payload and 4 B of the header.

In another example, the video stream may be obtained in a Digital Video (DV) standard. For instance, DV packets may be obtained from DV equipment, e.g. a DV camcorder or a DV recorder, via IEEE1394 protocol (commonly known as FireWire). In the DV format, a video frame according to the NTSC (National Television System Committee) video method (525 lines/frame, 30 video frames per second) consists of 1500 DV blocks that have the size of 80 B. The DV/IEEE1394 packets obtained from the DV equipment may have a format with a header of 12 B and a body of 480 B (6 DV blocks). Thus, the video frame may comprise 250 DV blocks. On the basis of this information, it is possible to determine the bit rate of the video stream obtained from such DV equipment. The bit rate of the video stream in other formats may be computed.

In step 120, a period of time is determined for calculating an average bit rate of the video stream. The period may be pre-set to a value of several seconds, two to five seconds or more (step 121). Alternatively, the period of time may be variable. For example, shot cuts, e.g. scene changes, in the video content item may be detected in step 125 and the period of time may be adjusted to the detected shot-cuts accordingly in step 126, so that a particular period of time may be equal to a period between scene changes. In a further example, if the time period between detected scene changes is too large, e.g. exceeding some pre-set maximum threshold, it may be split into shorter time periods over which the average bit rate may be calculated. The scene changes may be determined, for example, by using a scene change detector known from document EP1,006,685. The scene change detector calculates an inverse correlation value of successive frame images. The correlation value is estimated on the basis of absolute values of differences between pixel values of corresponding pixels of the images. The scene change is determined when the correlation value exceeds a predetermined threshold value. Fast motion detectors known in the prior art may also be used for detecting scene changes. When the video stream is encoded, partial decoding of the stream to obtain distribution of the headers of the packets and detect the scene changes may be sufficient, without complete decoding of the video stream, e.g. the MPEG stream.

In the next step 130, the average bit rate of the video stream over the determined period of time may be estimated in different manners. The average bit rate may be computed by adding values of the bit rate over the determined period of time and dividing the sum by the number of values. In another example, a moving average bit rate may be calculated, e.g. mean value calculated over a rolling previous period of fixed length. The average of the bit rate may smooth small variations of the bit rate that are, e.g., due to noise instead of real boundary of the content item, and real changes in the type of content.

By detecting a change of the determined average bit rate, a boundary of the content item may be found in step 140. For example, a threshold bit rate value may be compared with the determined average bit rate, and the boundary of the content item may be determined if the threshold value is exceeded. The threshold value may be fixed or variable. For example, the threshold value may be a percentage of the average bit rate within which it may change with respect to the values of the average bit rate calculated for the previous period or several preceding periods. In this case, the absolute value of the threshold for the average bit rate is not fixed. In another example, a first derivative of the values of the average bit rate for consecutive periods of time may be estimated to detect the rapid change of the average bit rate.

When the period of time for calculating the average bit rate is not short enough to determine the boundary of the content item with acceptable accuracy, e.g. half a second, one second, etc, a position of the detected boundary of the content item within the corresponding period of time may be determined in step 150. The position of the boundary may be determined by comparing the values of the bit rate for progressive frames in the video stream; by partitioning the given period of time into small segments and comparing the average bit rate values for each successive segment with the period of time in which the boundary of the content item is determined, or in other manners.

Figure 2:
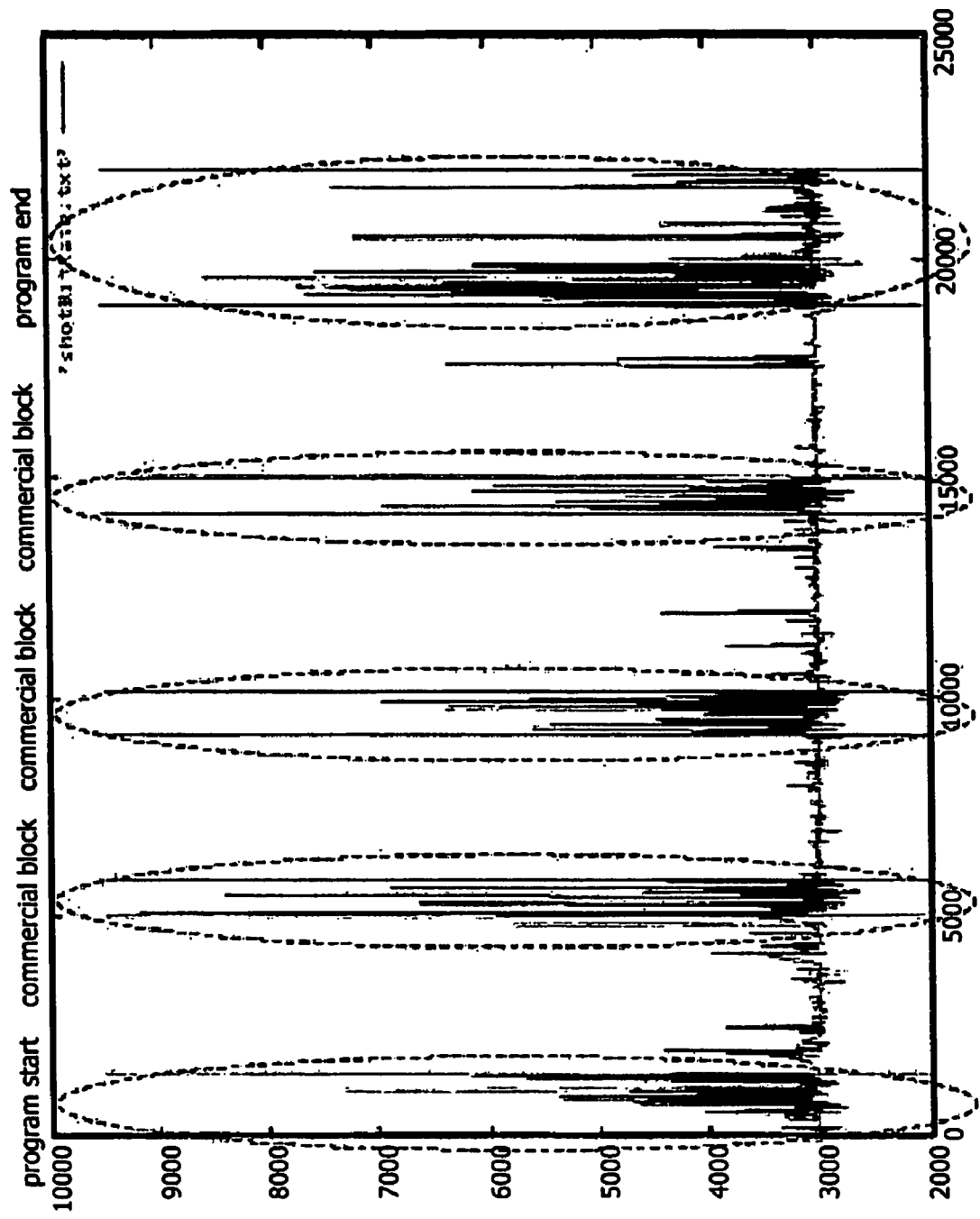
FIG. 2 depicts a diagram showing an example of the calculated average bit rate of the video stream.

FIG. 2 shows the average bit rate of the video stream calculated for the TV program "Presumed Innocent" received from a digital broadcast. The program has a duration of approximately 2 hours and 55 minutes. The start and end times of broadcasting the program were based on a TV program guide (EPG) and extended for a few minutes. The real beginning and end of the program and commercial blocks are highlighted. The vertical axis in FIGS. 2 and 3 reports the average bit rate in kbits per second and the horizontal axis reports the progressive frame number.

Figure 3:
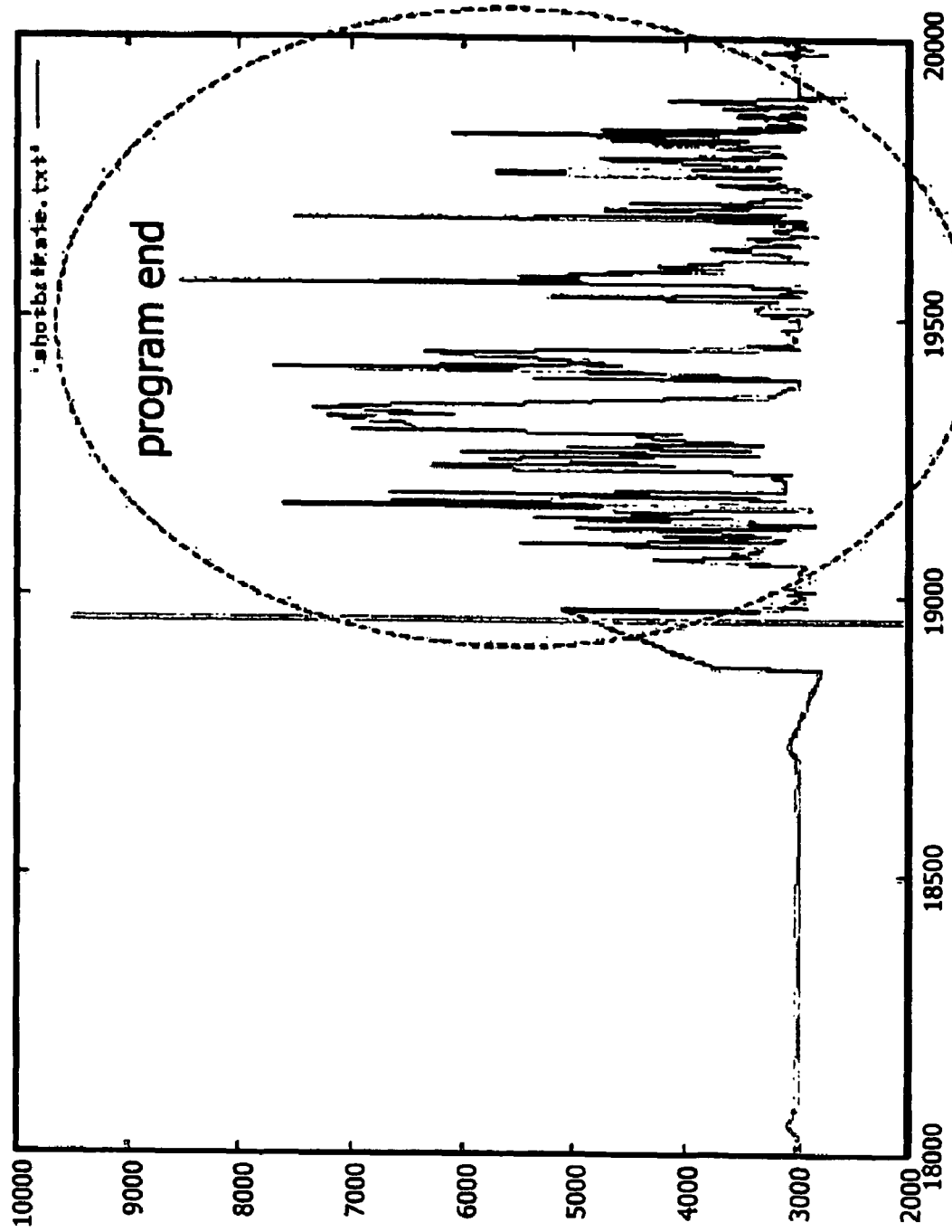
FIG. 3 depicts an enlarged diagram showing an example of the calculated average bit rate at the end of the content item.

In this example, the average bit rate shown in FIG. 2 changes dramatically during program boundaries and commercial blocks. The average bit rate changed considerably in the beginning of the program, especially in the first 1500 frames. Three commercials in the program also caused many changes in the average bit rate. Finally, the average bit rate changed significantly at the end of the program, as is shown in FIG. 3. FIG. 3 shows changes of the average bit rate within a thousand video frames at the end of the program. These changes may be caused by splicers used by providers of the video content to insert digital content such as commercials into the video content which might already have been digitized, without the need for expensive decoding and re-encoding which can reduce the quality of content.

Typically, the TV broadcasters or other providers of content insert the commercial blocks in different content items in a similar way, for example, in the beginning and/or end, and may be several times in the middle of the content items. This pattern of a particular typical positioning of the commercials within the content items may be learnt by a device for detecting the boundary of the content item, and used for reliably determining whether the detected change of the average bit rate indicates the commercial block of the content item. Moreover, known methods of recognizing commercial blocks based on analyzing audio and/or video features of the content item may be used to verify whether the detected boundary belongs to the commercial.

The method of detecting the boundary of the content item as described above can also be applied to encrypted video streams with content items. Most digital video streams, e.g. PayTV and Pay per View, are packetized in the conventional manner, but the packets are encrypted by using specific keys and methods. Conditional access systems adopted by broadcasters and set-top box manufacturers do not allow performing any operation on the stream but decoding in real time for viewing. The handling of encrypted streams will become very relevant for all products that have storage.

The method according to the present invention can be applied to the encrypted streams because it is based on the average bit rate over the particular period of time and the encryption of the stream does not substantially affect the average bit rate. There is no need for decrypting the video stream to detect the boundary of the content item. If necessary, the encrypted video stream may be decrypted only in its parts where the boundary has been detected. This is more efficient and less data-processing intensive than decrypting or decoding the whole stream to detect the boundary of the content item.

The average bit rate of the encrypted stream may be calculated, for example, by extracting the payload of the stream from the headers of the packets. For example, if the DVB stream is scrambled, the headers may not be encoded, as has been described for scrambling and conditional access systems in the book "Digital Television: MPEG-1, MPEG-2 and principles of the DVB system", by H. Benoit, 1997, Arnold (chapter 5, pages 75-80).

Figure 4:
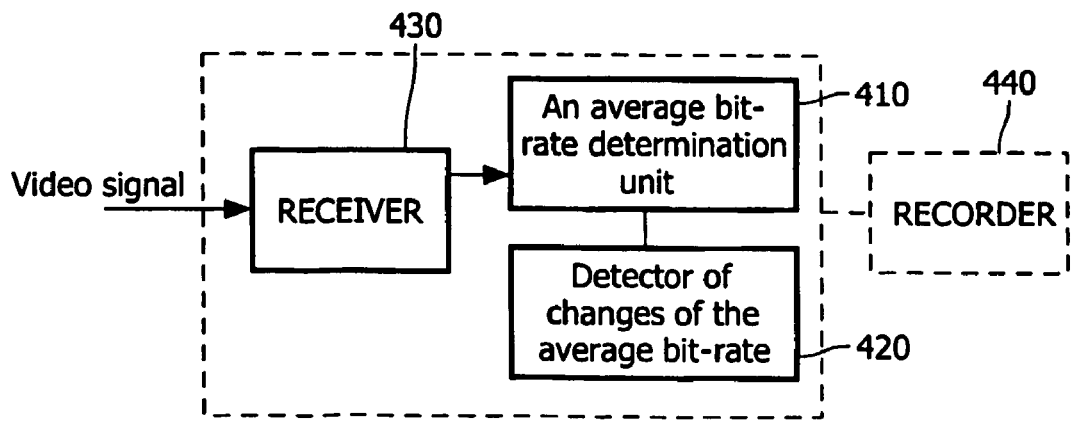
FIG. 4 shows a diagram illustrating the operation of the device suitable for implementing the present invention.

FIG. 4 shows an embodiment of a device for detecting the boundary of the content item in the digital video stream. The device may comprise a processor 410 arranged to process the video stream and determine an average bit rate of the video stream over the period of time, and a detector 420 for detecting the change of the average bit rate indicating the boundary of the content item.

The processor 410 may be arranged to perform steps 110 to 130 of the method of the present invention as described above. The processor may be implemented by the person skilled in the art in known manner, e.g., the processor can be provided with a memory in the form of a non-transitory computer-readable storage medium for storing instructions to be executed by the processor so as to enable it to function correspondingly. The detector 420 may be arranged to carry out operations disclosed above with reference to step 140 of the present method. The detector may be implemented by using the same processor 410 or, for example, the detector may be a separate circuit arranged to compare the average bit rate determined by the processor with the threshold bit rate value, and generate a signal indicating that the boundary of the content item has been detected.

The processor 410 may be coupled to a receiver 430 for receiving at least one content item in the digital broadcast video stream, e.g. TV tuner, DVB-T or DVB-S receiver. Such a tuner/receiver may be conventional and implemented as known in the art.

The device may be coupled to a recorder 440 for recording the TV program on the basis of the detected boundary of the program in the stream. The recorder may be arranged to record the TV program on the basis of broadcast schedule data, e.g. the EPG data indicating the beginning and end of the program. However, it may happen that the program is received by the receiver not according to the schedule and the recorder will record content which is not required. This may be obviated by means of the device for detecting the boundary of the content item as described above. The device may be arranged to verify whether the broadcast schedule data are in accordance with the detected boundary of a respective content item. If there is some difference in time between said detected boundary and the schedule data, i.e. the content item is actually received later or earlier than the schedule data indicate, the recorder may be instructed to start recording the content item at the position where the boundary is determined. Furthermore, if the commercial blocks are detected in the stream by the device, the recorder may be instructed to skip them, and only the actual content item will be recorded.

The various program products may implement the functions of the device and method of the present invention and may be combined in several ways with the hardware or located in different other devices. Variations and modifications of the described embodiment are possible within the scope of the inventive concept. Thus, for example, the use of the verb 'to comprise' and its conjugations does not exclude the presence of elements or steps other than those defined in a claim. The invention can be implemented by means of hardware comprising several distinct elements, and by means of a suitably programmed computer. In the device claim enumerating several means, several of these means can be embodied by one and the same item of hardware.

The invention claimed is:

1. A method of detecting a boundary of a content item in a digital video stream, the method comprising the steps of:
    determining, in a processor, an average bit rate of an incoming digital video stream over a period of time;
    detecting locations of shot-cuts in the digital video stream;
    adjusting the period of time in the determining step based on the detected shot-cut locations; and
    detecting, in a detector, a change of the average bit rate, a location in the video stream of the change in the average bit rate being indicative of a boundary of the content item.

2. The method as claimed in claim 1, wherein the content item is in a digital broadcast video stream.

3. The method as claimed in claim 1, wherein said determining step determines a moving average of the bit rate.

4. The method as claimed in claim 1, wherein the content item is a commercial.

5. The method as claimed in claim 1, wherein the digital video stream is MPEG compressed.

6. The method as claimed in claim 1, wherein the content item is in an encrypted digital video stream, and wherein the steps of the method are performed on the encrypted digital video stream.

7. The method as claimed in claim 1, wherein said method further comprises the steps of:
    obtaining broadcast schedule data indicating a beginning and/or end of broadcasting at least one content item; and
    verifying whether said broadcast schedule data are in accordance with the detected boundary of a respective content item in the video stream.

8. The method as claimed in claim 1, wherein said method further comprises the step of:
    determining a position of the detected boundary of the content item within a corresponding period of time.

9. A non-transitory computer-readable storage medium having a computer program recorded thereon for causing a programmable device when executing said computer program to carry out the method as claimed in claim 1.

10. A device for detecting a boundary of a content item in a digital video stream, the device comprising:
- means for detecting locations of shot-cuts in the digital video stream;
- means for adjusting a period of time based on the detected locations of shot-cuts;
- means for determining a moving average bit rate of the digital video stream over the period of time; and
- means for detecting a change of the moving average bit rate, a location of said detected change being indicative of the boundary of the content item.

11. A receiver for receiving at least one content item in a digital broadcast video stream, said receiver comprising the device as claimed in claim 10.

12. A video recorder for recording at least one TV program, comprising:
- a receiver for receiving at least one TV program in a digital video stream;
- the device as claimed in claim 10 in which the content item is the TV program; and
- means for recording the TV program based on its detected boundary in the video stream.

* * * * *